United States Patent [19]

Saito et al.

[11] Patent Number: 4,675,908

[45] Date of Patent: Jun. 23, 1987

[54] IMAGE DATA PROCESSING APPARATUS AND SYSTEM

[75] Inventors: Seiji Saito, Yokosuka; Yasuhisa Ishizawa, Yokohama, both of Japan

[73] Assignee: Canon Kabushiki Kaisha, Tokyo, Japan

[21] Appl. No.: 656,729

[22] Filed: Oct. 1, 1984

[30] Foreign Application Priority Data

Oct. 7, 1983 [JP] Japan .............................. 58-186804
Oct. 17, 1983 [JP] Japan .............................. 58-193877

[51] Int. Cl.$^4$ ............................................. G06K 9/36
[52] U.S. Cl. ......................................... 382/41; 382/47
[58] Field of Search .................. 382/41, 56, 47, 49; 358/283, 284

[56] References Cited

U.S. PATENT DOCUMENTS 4,167,728  9/1979  Sternberg .............................. 382/49
4,275,450  6/1981  Potter ..................................... 382/47
4,301,469 11/1981  Modeen et al. ........................ 382/56
4,453,267  6/1984  Paganini et al. ....................... 382/56
4,525,858  6/1985  Cline et al. ............................ 382/41
4,545,068 10/1985  Tabata et al. ......................... 382/41

Primary Examiner—Anthony V. Ciarlante
Attorney, Agent, or Firm—Fitzpatrick, Cella, Harper & Scinto

[57] ABSTRACT

An image data processing apparatus has an image reader for reading a halftone image or character image, and an operational processing system including an interface, a main memory, a DMAC, an MPU, a CRT, a CRTC, and an enlargement/reduction operation circuit. An image data processing system including a microcomputer, a laser beam printer, and an image file or the like allows real-time image data display or printing at any desired enlargement/reduction ratio as an image is read by the image reader while not impairing the characteristics of either the halftone or the character image.

18 Claims, 9 Drawing Figures

IMAGE DATA PROCESSING APPARATUS AND SYSTEM

BACKGROUND OF THE INVENTION

1. Field of the Invention

The present invention relates to an image data processing apparatus and system for processing image data.

2. Description of the Prior Art

With recent rapid developments in image data processing systems incorporating computers, demand has arisen for high-speed processing of image data as well as data processing or word processing. Along with this tendency, image data is frequently inputted through an input apparatus such as an image reader, the input image data is processed with an operational processing apparatus, and the processed image data is supplied to an output apparatus such as a laser beam printer and printed thereby.

In such a case, image data read by an image reader is stored as original image data in a main memory of the operational processing apparatus through an interface. Thereafter, in order to display the image data on a CRT display, the operational processing apparatus processes the data to reduce or enlarge the image, and stores the processed data in a CRT display memory. Thereafter, editing such as image extraction or shifting of the image is performed on the CRT display.

The edited image data is stored in a memory device such as an electronic file or a disk device or is supplied to a hard copy apparatus such as a laser beam printer.

However, in such a conventional technique, the image data read by an image reader is supplied to the main memory until all the original image data is stored therein, and then the processed image data for CRT display is transmitted. For this reason, it takes a considerable period of time before the image data is displayed on the CRT display after it is read by the image reader.

SUMMARY OF THE INVENTION

It is an object of the present invention to eliminate the above problems.

It is another object of the present invention to provide an image data processing apparatus and system which can perform high-speed processing of image data.

It is still another object of the present invention to provide an image data processing apparatus and system which can produce a high-quality image.

It is still another object of the present invention to provide an image data processing apparatus and system which allows selection of processing which is suitable to each type of image data to be processed.

It is still another object of the present invention to provide an image data processing apparatus and system in which image data produced from a data generator is stored in a main memory of an operational processing apparatus, an operational processing unit in the operational processing apparatus performs parallel operational processing of the original image data, and the processed image is stored in, for example, a CRT display memory, so that the image data can be displayed on a CRT display.

According to the present invention, the foregoing objects are attained by means of an image data processing apparatus having an image data generating means, such as an original reader, and, optionally, means for processing the image data. First and second image data receiving means, which may be part of the processing means, if any, are arranged to receive the image data from the data generating means. Both receiving means preferably receive the image data substantially at the same time, while the second receives image data different in type from that received by the first receiving means. For example, one of the receiving means may include a main memory which receives the data essentially as output by the generating means (or in some other form, if desired), while the second may be, for example, a display memory for controlling the display of a CRT which receives the data after the latter is processed in some fashion.

The above and other objects of the present invention will become apparent from the following description taken in conjunction with the accompanying drawings.

DETAILED DESCRIPTION OF THE PREFERRED EMBODIMENTS

The present invention will now be described in more detail with reference to the accompanying drawings.

Figure 1:
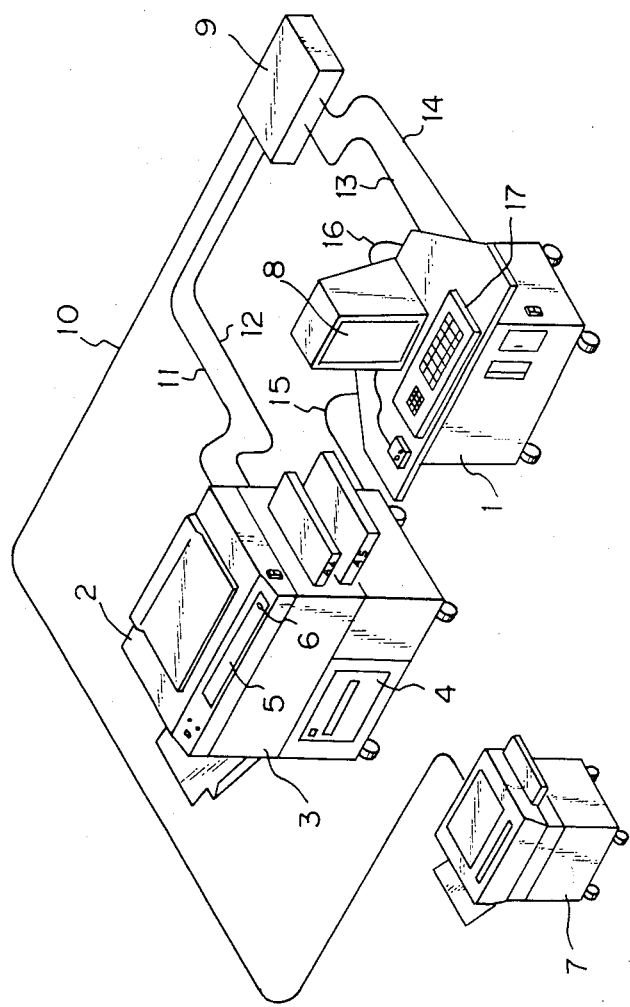
FIG. 1 is a view showing the outer appearance of an image processing system to which the present invention can be applied.

FIG. 1 is a view showing the outer appearance of an image processing system to which the present invention can be applied. A control section (to be referred to as a work station) 1 has a microcomputer for controlling the overall system, an internal memory comprising a RAM, ROM or the like, and an external memory comprising a floppy disk, a cartridge disk or the like. An original reader 2, e.g. of a type used as an input section of a digital copying machine (image reader), reads information on an original placed on an original table through an image pickup device such as a CCD and converts the read information into electrical signals. A high-speed printer (e.g., a laser beam printer) 3 as an output section of the digital copying machine records an image on a recording medium at high speed in accordance with the electrical signals. An image file 4 has a recording medium such as an optical disk or an optomagnetic disk and allows a read/write operation to be performed on a large amount of image data. A printer (e.g., a laser beam printer) 7 similar to the printer 3 is smaller than the printer 3 and has a lower speed than that of the printer 3. The printer 7 can be omitted or included as needed. A CRT (cathode-ray tube) device 8 displays image data photoelectrically read by the digital copying machine, or control data of the system. A switching device 9 switches connection between the respective input/output equipment pieces in accordance with a signal from the control section 1. Cables 10 to 16 electrically connect the respective input/output equipment pieces. A keyboard 17 is arranged at the control section 1. When the operator operates the keyboard 17, a corresponding operation command (e.g., a size change display command on the CRT or the like) of the system is inputted. A control panel 5 is for inputting a control command of the digital copying machine. The control panel 5 has keys for setting the preset number of copies to be produced, the magnification factor or the like, a copy start key 6 for instructing start of the copying operation, a numerical indicator, and the like.

Since the constructions of the original reader 2, the printers 3 and 7, and the like described above are known, a detailed description thereof will be omitted herein.

Figure 2:
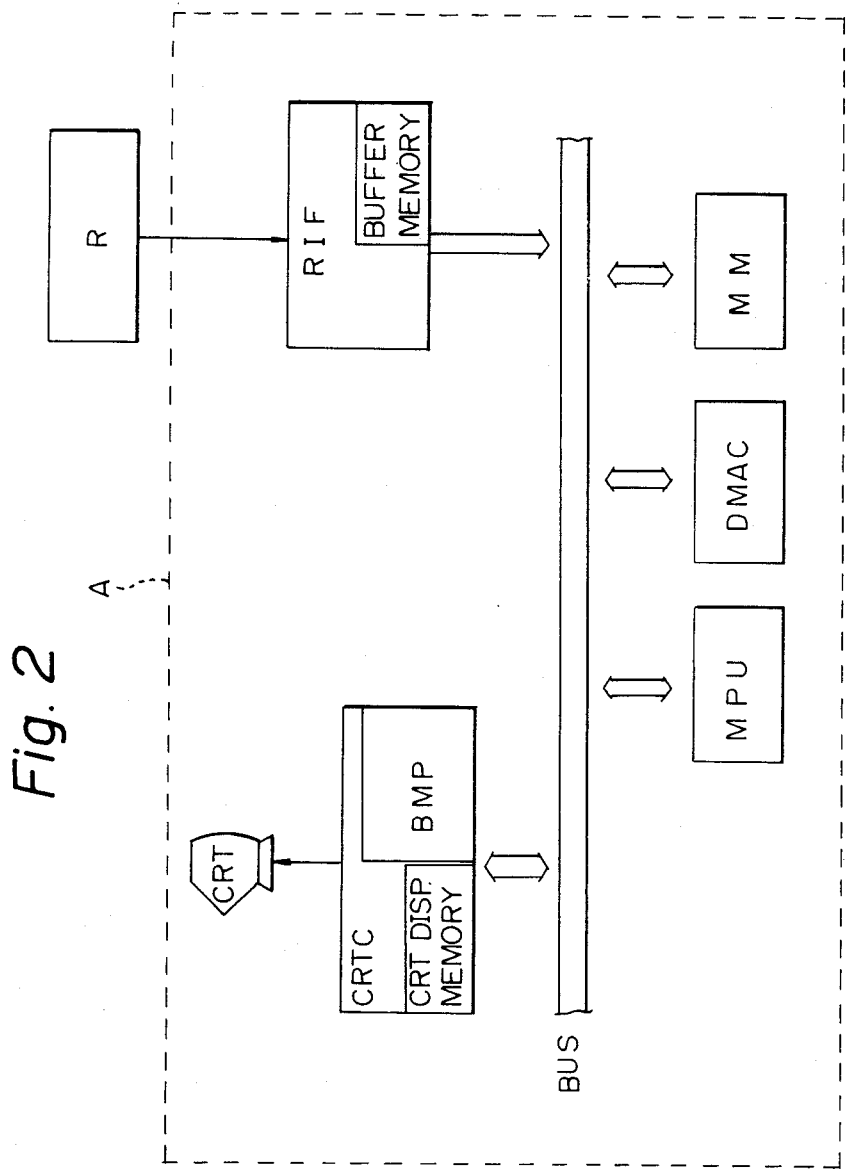
FIG. 2 is a system block diagram of a first embodiment of the present invention.

FIG. 2 is a system block diagram according to an embodiment of the present invention. A data bus BUS connects an image reader R, an image reader interface RIF of an operational processing system A, a main memory MM, a direct memory access controller DMAC, a microprocessor unit MPU, a cathode-ray tube CRT, a CRT controller CRTC, and an operation circuit BMP which is a part of the CRTC, enlarges or reduces image data and writes the data in a CRT display memory in the CRTC.

The image reader R in FIG. 2 corresponds to the reader 2 in FIG. 1, the CRT of the operational processing system A corresponds to the CRT device 8, and the operational processing system A constitutes part of the control section 1.

Figure 3:
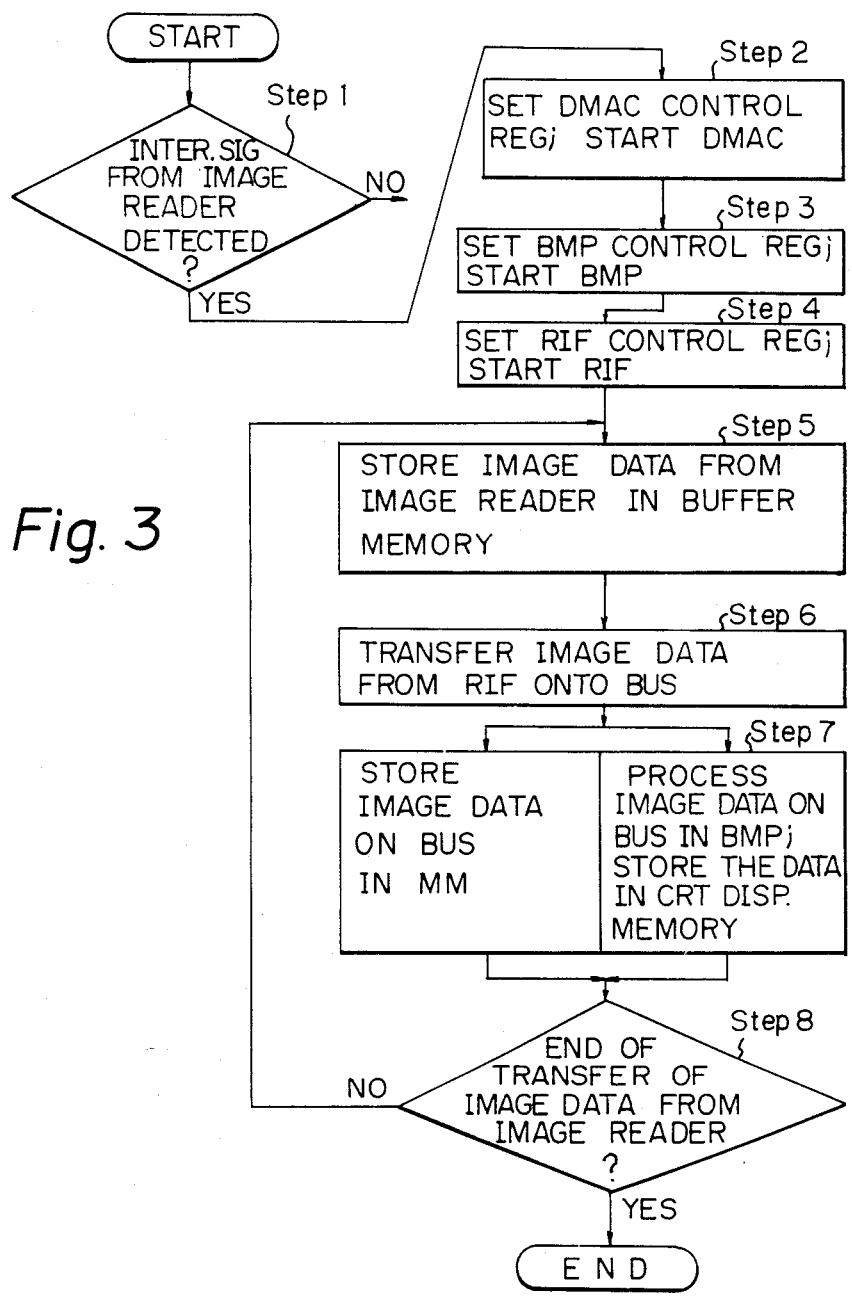
FIG. 3 is a flow chart of the operation of the system shown in FIG. 2.

FIG. 3 is a flow chart of the system shown in FIG. 2. Steps 1 to 4 are executed by the MPU. When the MPU detects an interrupt signal from the image reader R (step 1), it sets, in step 2, control data for controlling the DMAC in a register and starts the DMAC by issuing to it a DMA burst transfer. In step 3, the MPU sets control data for controlling the BMP in a register and starts the BMP. In step 4, the MPU sets control data for controlling the RIF in a register and starts the RIF. In step 5, the control process is transferred from the MPU to the DMAC, BMP, and RIF. The RIF (see FIG. 2) writes in a buffer memory of the RIF image data of an original of a predetermined size which is sent from the image reader R and which is read at a predetermined resolution. The buffer memory is, for example, a line memory. In step 6, the image data written in the buffer memory of the RIF is supplied to the BUS. In step 7, the image data on the BUS is written in the MM under the control of the DMAC, the data on the BUS is fetched in the BMP in the CRTC and processed in the enlargement/reduction processing circuit (density conversion circuit) in the BMP, and the processed image data is written in the CRT display memory in the CRTC. The BMP reduces the image size by interlacing lines relating to the image data on the BUS or pixels in the lines of the image data on the BUS. The BMP will be described in further detail below.

Steps 5, 6 and 7 are repeated as long as image data is supplied from the image reader R.

Figure 4:
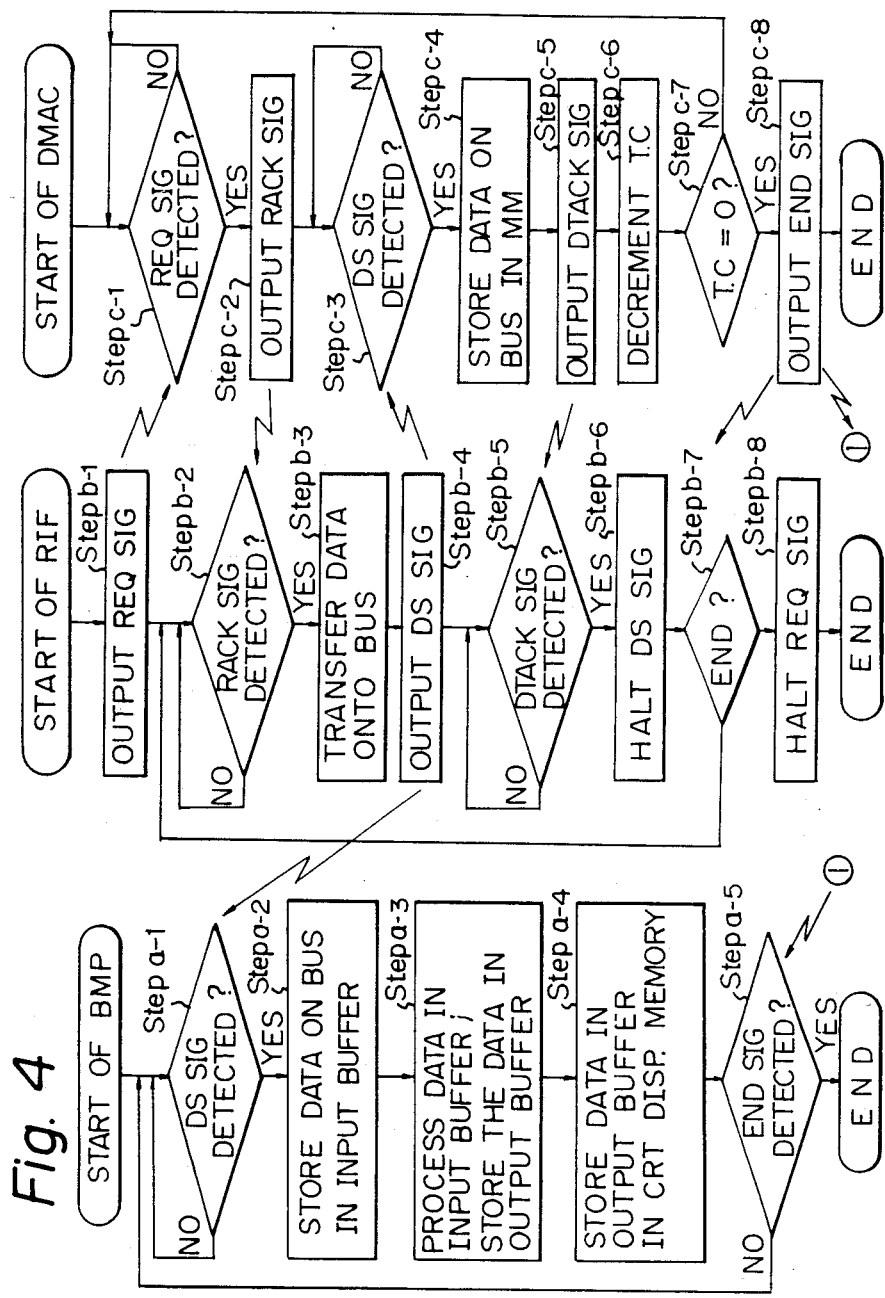
FIG. 4 is a detailed flow chart of the chart shown in FIG. 3.

FIG. 4 shows a detailed flow chart of steps 6 and 7 in the flow chart shown in FIG. 3. The RIF writes in the buffer memory the image data supplied from the image reader R and thereafter sends a REQ signal (step b-1). Meanwhile, the DMAC has been started and is in the wait state until the REQ signal is detected. When the DMAC detects the REQ signal from the RIF (step c-1), it sends a RACK signal (step c-2). After the RIF circuit sends the REQ signal, it is in the wait state until the RACK signal is detected (step b-2).

When the RIF detects the RACK signal supplied from the DMAC (step b-2), it sends the data in the buffer memory of the RIF onto the BUS (step b-3) and sends a data strobe signal DS (step b-4). The DMAC is in the wait state until the DS signal is detected. When the DMAC detects the DS signal (step c-3), it writes the image data on the BUS into the MM and sends a data acknowledge signal DTACK (steps c-4 and c-5). The DMAC then decrements a data transfer counter T.C (step c-6). The flow returns to the start if the T.C is not 0, or an END signal is produced and the task ends if the T.C is 0 (steps c-7 and c-8). A value corresponding to image data of one page is preset in the data transfer counter T.C. The RIF is in the wait state until the DTACK signal is detected. When the DTACK signal is detected (step b-5), the RIF halts transmission of the DS signal (step b-6).

The BMP is in the wait state until the DS signal from the RIF is detected. When the DS signal is detected (step a-1), the BMP writes the data supplied onto the BUS from the RIF in an input buffer in the BMP (step a-2). In accordance with a control signal written in a control register of the BMP, the enlargement or reduction circuit and a corresponding magnification factor are selected for the image data written in the input buffer, the data is converted into enlarged or reduced image data (density converted data), and the data is written in an output buffer in the BMP (step a-3). The processed image data written in the output buffer of the BMP is written at a predetermined address of the CRT display memory of the CRTC in accordance with address data from the BMP (step a-4). The processed data is displayed on the CRT display.

Processing of image data according to the flow shown in FIG. 4 is performed every time one word of image data (16 bits) is produced from the RIF.

The enlargement/reduction processing circuit in the BMP will be described below.

Figure 5:
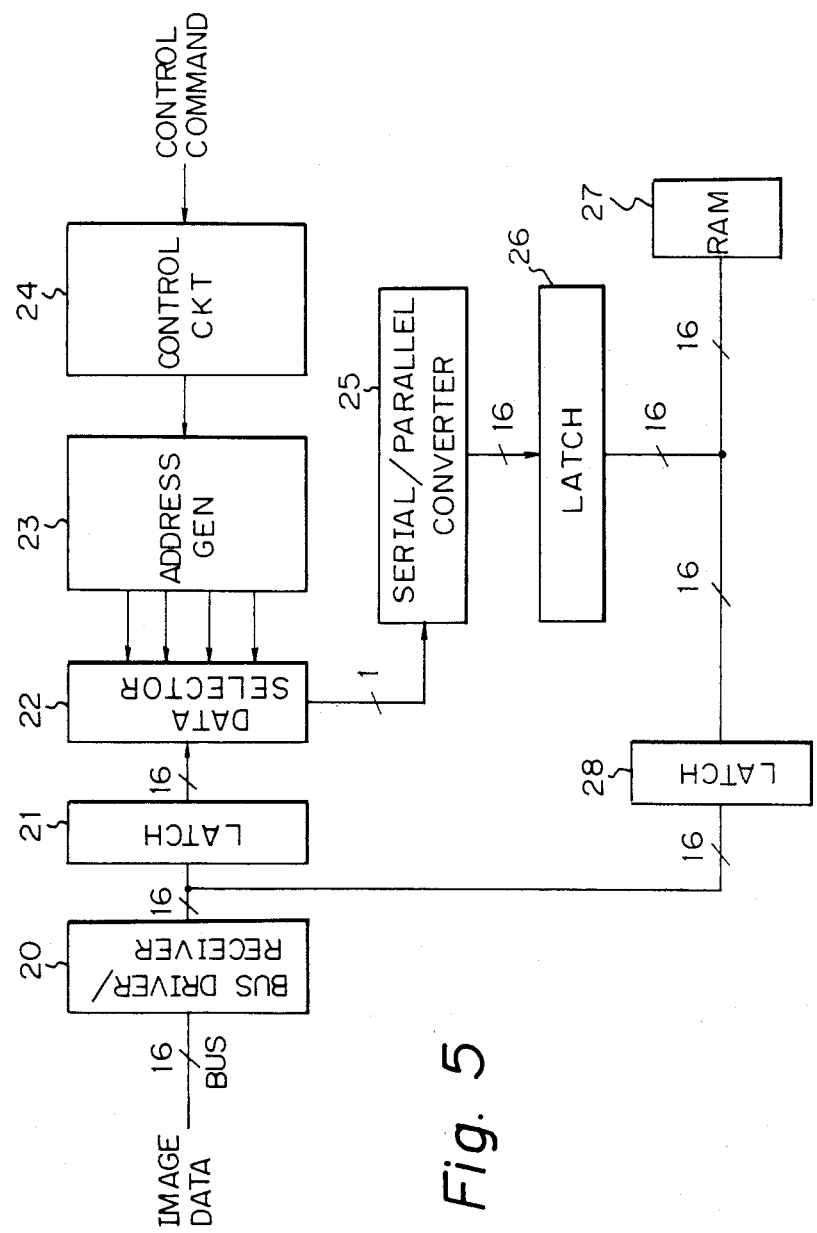
FIG. 5 is a diagram of an enlargement/reduction circuit.

FIG. 5 shows an example of the enlargement/reduction processing cirduit in the BMP. The circuit processes input binary image data for image enlargement/reduction in accordance with control data received from the MPU. Referring to FIG. 5, numerals on each line represent the bit number of this line. A BUS driver/receiver 20 controls input/output of image data. Latches 21, 26 and 28 latch data. A data selector 22 selects a predetermined bit of the 16-bit image data in accordance with an output from an address generator 23. The address generator 23 generates an address in accordance with the preset enlargement/reduction ratio. A control circuit 24 controls the address generation mode of the address generator 23 in accordance with a control command (magnification factor) from the MPU. A serial/parallel converter 25 converts the serial 1-bit image data into parallel 16-bit image data. A buffer memory (RAM) 27 stores image data of one line from the latch 26.

The operation of the circuit will now be described. The 16-bit image data received through the BUS driver/receiver 20 is stored in the data selector 22 through the latch 21. The address generator 23 generates an address in accordance with the preset magnification factor. When a magnification factor of 0.5, for example, is preset in accordance with a control command from the MPU, the address generator 23 sequentially selects addresses 0, 2, 4, 6, 8, 10, 12, and 14 among addresses 0 to 15 of the data selector 22. As a result, 8-bit reduced image data which is sampled at every one bit is sequentially supplied to the serial/parallel converter 25. The serial/parallel converter 25 can store upto 16 bits. Therefore, when the next 8-bit segment of image data from the data selector 22 is received, the converter 25 supplies the corresponding parallel 16-bit reduced image data to the RAM 27 through the latch 26. The reduced image data in the RAM 27 is stored in a CRT display memory through the latch 28 and the BUS driver/receiver 20. When a magnification factor of 2.0 is set by a control command from the MPU, the address generator 23 designates each address of the data selector 22 twice. Then, the enlarged image data, in which each bit is doubled, is sequentially supplied to the serial/parallel converter 25. 16-bit (1-word) image data stored in the data selector 22 is converted into 32-bit data by designating each address twice. Therefore, enlarged image data corresponding to original 16-bit image data is supplied in two separate operations to the serial/parallel converter 25. The enlarged image data from the serial/parallel converter 25 is stored in the RAM 27 and is then transferred to the CRT display memory. The above-mentioned enlargement/reduction processing is performed in the row direction (main scan direction); enlargement/reduction processing in the column direction is performed in the following manner.

When a magnification factor of 0.5 is set, reduced image data stored in the RAM 27 is produced by performing an interlace by means of every line by the BMP, and the image data which has also been reduced to ½ the original size in the column direction is produced from the RAM 27. When a magnification scale of 2.0 is set, the BMP produces enlarged(×2) image data of each line in the RAM 27 twice. Then, image data which has also been enlarged in the column direction is produced from the RAM 27.

As has been described above, while the image data read by the image reader R is written in the MM of the operational processing system A, a processed image which has been enlarged or reduced from the original image by a predetermined ratio is written in the CRT display memory and is displayed in the CRT display in real time.

The RIF and BMP repeat the above operation until the END signal from the DMAC is detected (steps a-5 and b-7). When the END signal is detected, the RIF and BMP stop operating.

In the above embodiment, when the image data is written in the MM, it is also processed and the processed data is stored in the CRT display memory. However, the image data can be supplied to first and second printers instead of being stored in the MM and CRT display memory.

The processing operation of the image data is not limited to enlargement/reduction (density conversion) but can be other processing such as trimming, masking, a rotation of the like.

A second embodiment according to the present invention will now be described.

In this embodiment, enlargement/reduction processing suitable for properties of input image data from an image reader R is performed.

Depending upon whether a photographic image (halftone image) or a character image (non-halftone image) is read from the image reader R, the processing method of the image data must be changed properly. That is, dither processing is performed for the photographic image, and threshold processing (slice digitization or quantization) is performed for the character image. When image data read by the image reader R is processed for enlarging or reducing the image, the processing after the dither processing or slice digitization must be different from each other.

Figure 6:
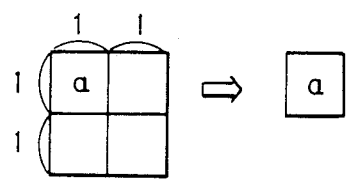
FIG. 6 is a diagram for explaining a method of reducing image data which has been sliced and digitized.

FIG. 6 shows an example of the reduction method of the image data which has been subjected to the slice digitization. In this example, the image is reduced to half the original size in both the vertical and horizontal directions. The upper left dot of each 2×2 (=4) dot matrix is sampled. The reduction method illustrated in FIG. 6 has been described with reference to the first embodiment.

When the binary digitization as shown in FIG. 6 is performed after the character image read by the image reader R is subjected to the dither processing, the reduced image data may fail to express a satisfactory halftone image depending upon the particular threshold value of the dither matrix used in the dither processing. That is, the low or high density level may be inadvertently emphasized.

Figure 7:
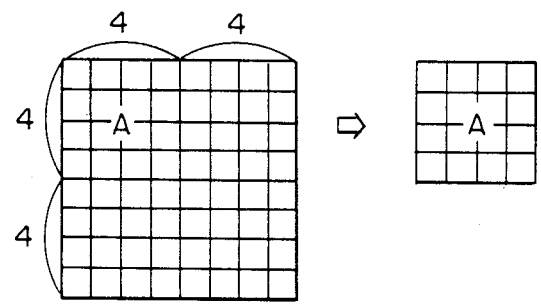
FIG. 7 is a diagram for explaining a method of reducing image data which has been subjected to dither processing.

In view of this problem, in the second embodiment, when a photographic image which has been subjected to dither processing is inputted, reduction processing as shown in FIG. 7 is performed.

FIG. 7 shows an example of the method of reducing image data after dither processing. In this case, the image is reduced to ½ the original image size in both the vertical and horizontal directions. The upper left matrix of 2×2 matrices (each comprising 4×4 dots) is sampled.

This one matrix (4×4 dots) corresponds to the 4×4 dither matrix which is used in dither processing by the image reader.

When the processing as shown in FIG. 7 is performed, reduction processing of the image data can be performed without deterioration of the pattern obtained by dither processing.

The mode of operation of the second embodiment will now be described in detail. The circuit components to be used are the same as those in FIG. 2. Therefore, the description will be made with reference to FIG. 2.

Figure 8:
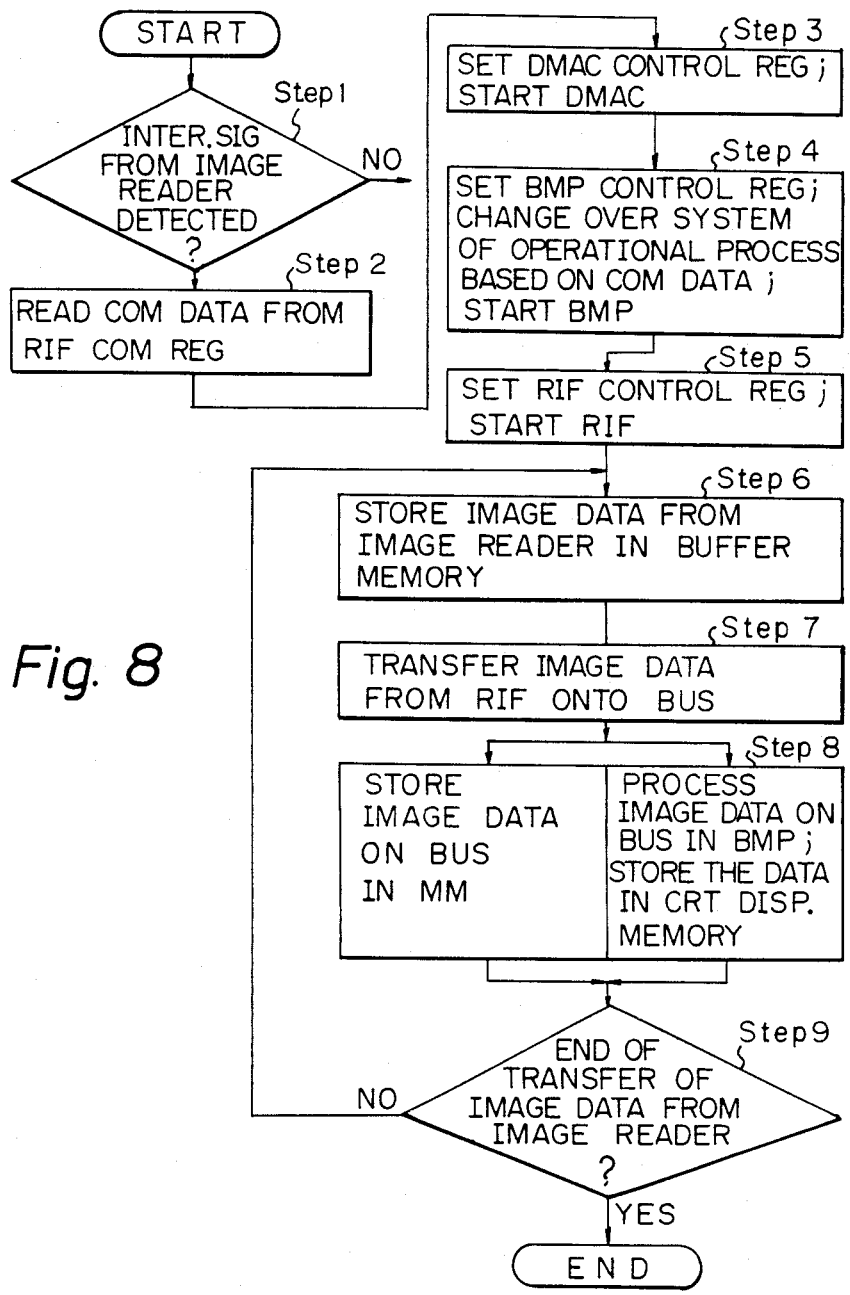
FIG. 8 is a flow chart of an operation according to a second embodiment of the present invention.

FIG. 8 is a flow chart showing the operation flow of the second embodiment. When a microprocessor unit MPU shown in FIG. 2 detects an interrupt signal from an image reader R (step 1), it reads command data in a command register of an image data interface RIF in step 2. The command data includes command information which represents if the image data supplied from the image reader R is image data of a photographic image or that of a character image. In step 3, the MPU sets control data for controlling a direct memory access controller DMAC in a register, and starts the DMAC by indicating a direct memory access burst transfer. In step 4, the MPU sets control data for controlling the BMP in a register, changes over an operational processing system of the BMP in accordance with the command data from the RIF which represents either the photographic data or character data, and starts the BMP. In step 5, the MPU sets control data for controlling the RIF in a register. In step 6, the task is transferred from the MPU to the DMAC, BMP and RIF. The RIF writes in the buffer memory of the RIF image data of an original of a predetermined size which is supplied from the image reader R and which is read at a predetermined resolution. In step 7, the image data stored in the buffer memory of the RIF is outputted onto a data bus BUS. In step 8, the image data on the BUS is written in a main memory MM under the control of the DMAC and is fetched in the BMP of the CRTC. The data is processed by an enlargement or reduction circuit (density conversion circuit) in the BMP, and processed image data is written in a CRT display memory.

Steps 6, 7 and 8 are repeated while the image data is supplied from the image reader R.

Figure 9:
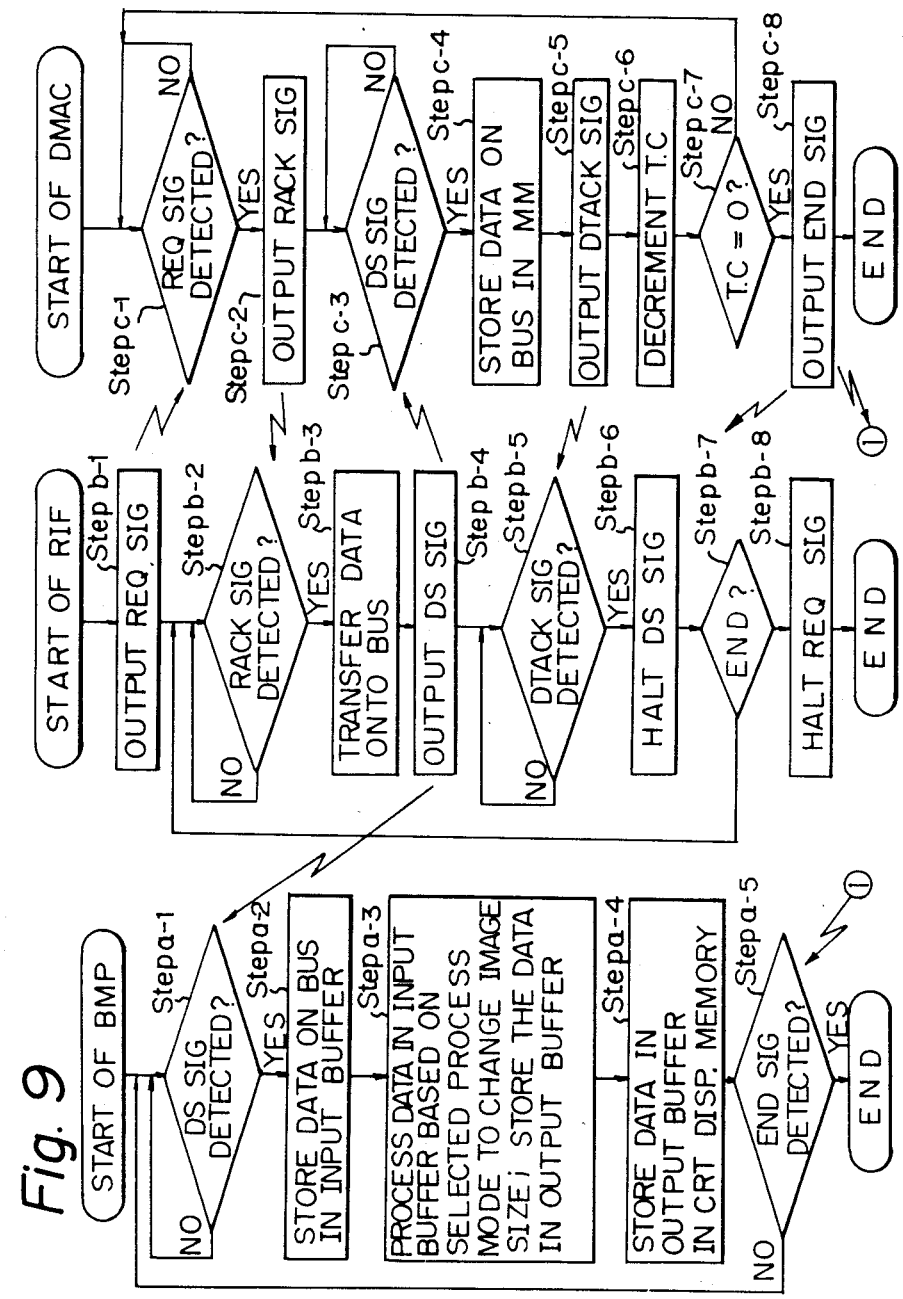
FIG. 9 is a detailed flow chart of the chart shown in FIG. 8.

FIG. 9 shows a detailed flow chart of steps 7 and 8 in the flow chart shown in FIG. 8.

Since steps b-1 to b-8 and steps c-1 to c-8 are the same as described with reference to FIG. 4, a description thereof will be omitted.

The BMP is in the wait state until the DS signal from the RIF is detected. When the DS signal is detected (step a-1), data on the BUS supplied from the RIF is written in the input buffer of the BMP (step a-2). In accordance with a control signal written in a control register of the BMP, an enlargement/reduction circuit for photographic or character image and a corresponding ratio are selected for the image data stored in the input buffer, and the image data is converted into enlarged or reduced data which is written in the output buffer of the BMP (step a-3). The processed image data written in the output buffer of the BMP is written at a predetermined address of the CRT display memory of the CRTC in accordance with address data from the BMP, and the processed data is displayed on the CRT display. The RIF and the BMP repeat the above operation until the END signal from the DMAC is detected. Therefore, the image data from the image reader is written in the MM of the operational processing system while it is processed properly and the processed data is displayed on the CRT display.

The enlargement/reduction circuit used in this embodiment is the same as that shown in FIG. 5. Enlargement/reduction processing similar to that described with reference to the first embodiment is performed when the input data from the image reader R is data after slice digitization. However, when the input data from the image reader is data after dither processing using a 4×4 dither matrix, the control circuit 24 changes over the address generation mode of the address generator 23 to one for a dither image. Then, when a magnification factor of 0.5, for example, is set, the address generator 23 sequentially selects addresses 0, 1, 2, 3, 8, 9, 10 and 11 among addresses 0 to 15 of the data selector 23. The BMP performs an interlace of every 4 lines of reduced image data stored in the RAM 27.

As a result, image reduction processing in units of 4×4 dot matrices is performed.

Likewise, in the case of enlargement processing, when the dither pattern is a 4×4 matrix, it can be performed in units of 4×4 dot matrices.

In this manner, enlargement/reduction of image is performed without deterioration of the pattern obtained by the dither processing. For this reason, excellent enlargement/reduction of the image can be performed without impairing reproducibility of the image by dither matrix processing.

In the above embodiment, the source image data is image data read by an image reader. However, the source image data can be image data stored in a memory device such as an electronic file.

The source image data may be image data which is supplied through a line of a network such as a local area network.

In the above embodiment, the source data is image data. However, the source data can be character font data stored in a memory means such as a ROM or a memory device.

The present invention is not limited to the above embodiments, and various other changes and modifications may be made within the spirit and scope of the present invention.

What we claim is:

1. An image data processing apparatus comprising:
   image data generating means for generating image data; and
   processing means for processing the image data generated by said image data generating means,
   wherein said processing means includes a first image data receiving means for receiving the image data from said image data generating means and a second image data receiving means for receiving the image data from said image data generating means, said first and second image data receiving means receiving the respective image data substantially at the same time while said second image data receiving means receives image data different in data type from the image data received by said first image data receiving means.

2. An apparatus according to claim 1, wherein said processing means includes means for performing variable magnification process of the image data from said image data generating means, and said second image data receiving means receives the image data processed by said variable magnification means.

3. An apparatus according to claim 2, wherein said processing means has display means, and said second receiving means is used for displaying the image data processed by said variable magnification means by means of said display means.

4. An apparatus according to claim 2, wherein said variable magnification means selects a variable magnification mode in accordance with a signal representing characteristics of the said image data.

5. An apparatus according to claim 4, wherein said variable magnification means has a first mode for performing variable magnification processing of dithered image data and a second mode for performing variable magnification processing of binary coded image data based on a predetermined threshold level, said first or second mode being selected in accordance with the signal representing the characteristics of the image data.

6. An apparatus according to claim 2, wherein said variable magnification means performs reduction processing of the image data from said image data generating means.

7. An apparatus according to claim 2, wherein said image data generating means includes means for reading an original image.

8. An apparatus according to claim 1, wherein said processing means has interface means for receiving the image data generated by said image data generating means, said interface means has buffer means for storing the received image data, and the image data stored in said buffer means is transferred respectively to said first and second receiving means substantially at the same time.

9. An apparatus according to claim 1, wherein said first and second receiving means comprise first and second memory means for storing the image data.

10. An image data processing apparatus comprising:
image data generating means fo generating image data;
first receiving means for receiving the image data;
second receiving means for receiving the image data; and
transfer means for transferring the image data generated by said generating means to said first and second receiving means,
said transfer means transferring the image data to said first receiving means while performing a predetermined processing of the image data during transfer of the image data and then transferring the processed image data to said second receiving means.

11. An apparatus according to claim 10, wherein said transfer means includes means for performing variable magnification processing of the image data during transfer of the image data, and said variable magnification means performs variable magnification processing of the image data as the predetermined processing by said transfer means.

12. An apparatus according to claim 11, further comprising dislay means, wherein said second receiving means is used for displaying the image data processed by said variable magnification means by means of said display means.

13. An apparatus according to claim 11, wherein said transfer means has interface means for receiving the image data generated by said image data generating means, said interface means has buffer means for storing the received image data, and the image data stored by said buffer means is transferred respectively to said first and second receiving means substantially at the same time.

14. An apparatus according to claim 11, wherein said variable magnification means selects a variable magnification mode in accordance with a signal representing characteristics of the image data.

15. An apparatus according to claim 14, wherein said variable magnification means has a first mode for performing variable magnification process of half-tone processed image data and a second mode for performing variable magnification processing of non-half-tone processed image data, said first or second mode being selected in accordance with the signal representing the characteristics of the image data.

16. An apparatus according to claim 10, wherein said variable magnification means performs reduction processing of the image data from said image data generating means.

17. An apparatus according to claim 10, wherein said first and second image receiving means comprise first and second memory means for storing the image data.

18. An apparatus according to claim 10, wherein said image data generating means includes means for reading an original image.

* * * * *